US006571515B1

(12) United States Patent
Samways et al.

(10) Patent No.: US 6,571,515 B1
(45) Date of Patent: Jun. 3, 2003

(54) MOTOR VEHICLE DOOR HAVING A MODULE CARRIER FOR MOUNTING A WINDOW LIFT TO THE DOOR

(75) Inventors: Dave Samways, Bosau (DE); Dirk Hasse, Alveslohe (DE); Peter Rahmstorf, Saint Laurent du Pont (FR)

(73) Assignee: Sommer Allibert-Lignotock GmbH, Worth am Rhein (DE)

(*) Notice: Subject to any disclaimer, the term of this patent is extended or adjusted under 35 U.S.C. 154(b) by 0 days.

(21) Appl. No.: 09/355,437

(22) PCT Filed: Jun. 18, 1997

(86) PCT No.: PCT/DE97/01288

§ 371 (c)(1),
(2), (4) Date: Jul. 28, 1999

(87) PCT Pub. No.: WO98/38056

PCT Pub. Date: Sep. 3, 1998

(30) Foreign Application Priority Data

Feb. 26, 1997 (DE) .......................... 197 09 835

(51) Int. Cl.⁷ ................................................ B60J 5/04
(52) U.S. Cl. .......................................... 49/502; 49/352
(58) Field of Search ......................... 49/352, 374, 375, 49/502; 296/146.7

(56) References Cited

U.S. PATENT DOCUMENTS

| | | | |
|---|---|---|---|
| 4,449,326 A | * 5/1984 | Hori et al. | 49/375 |
| 5,090,158 A | * 2/1992 | Bertolini | 49/348 |
| 5,171,058 A | * 12/1992 | Ishikawa | 296/189 |
| 5,333,411 A | * 8/1994 | Tschirschwitz et al. | 49/352 |
| 5,584,144 A | * 12/1996 | Hisano | 49/502 |
| 5,906,072 A | * 5/1999 | Feige et al. | 49/502 |
| 5,934,730 A | * 8/1999 | Yagishita et al. | 296/39.1 |
| 5,979,115 A | * 11/1999 | Szerdahelyi et al. | 49/502 |
| 6,029,403 A | * 2/2000 | Bertolini et al. | 49/502 |

FOREIGN PATENT DOCUMENTS

DE         44 26 426        2/1996

* cited by examiner

*Primary Examiner*—Gregory J. Strimbu
(74) *Attorney, Agent, or Firm*—Barnes & Thornburg

(57) ABSTRACT

A double walled vehicle door having an inside door panel and an outside door panel forming a space therebetween. The inside door panel having at least one cutout therein. A module carrier is attached to the inside door panel such that the module carrier covers and peripherally seals the at least one cutout. A dual cable window lift having guide bars each having a lower end with an associated pulley mounted thereon and an upper end with an associated pulley mounted thereon. The dual cable window lift being mounted on the module carrier such that the lower ends of the guide bars extend beyond a periphery of the module carrier and the upper ends of the guide bars are positioned within the periphery of the module carrier. The upper ends of the guide bars are mounted on a side of the inside door panel adapted to face an interior of the vehicle.

20 Claims, 9 Drawing Sheets

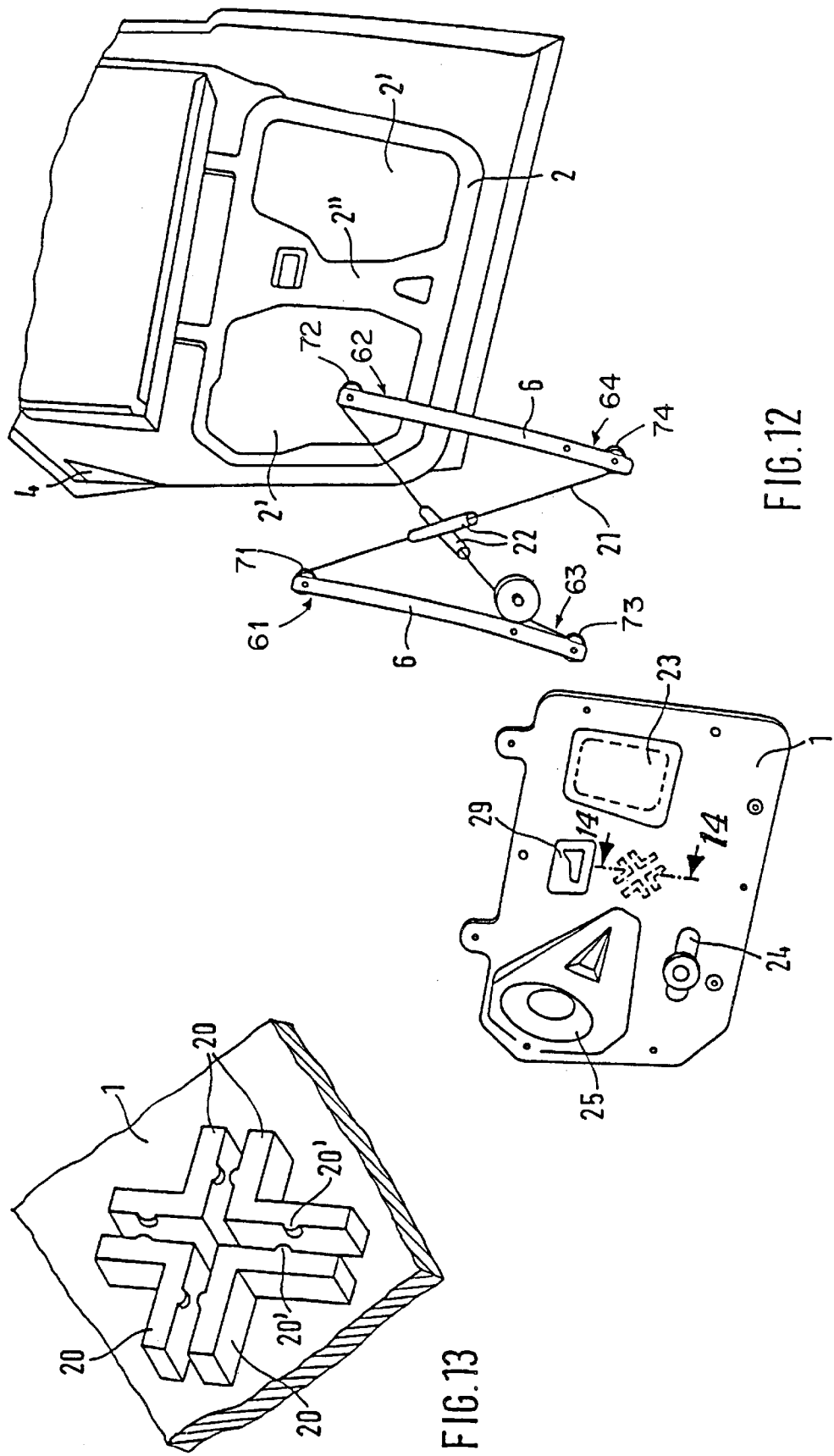

MOTOR VEHICLE DOOR HAVING A MODULE CARRIER FOR MOUNTING A WINDOW LIFT TO THE DOOR

CROSS-REFERENCE TO RELATED APPLICATIONS

This application is a U.S. national application of international application Ser. No. PCT/DE97/01288 filed Jun. 18, 1997, which claims priority to German Patent Application Ser. No. 197.09 835.5 filed Feb. 26, 1997.

BACKGROUND AND SUMMARY OF THE INVENTION

Motor vehicle doors with module carriers, which carriers are conventionally installed on the inner panels of doors and upon which are pre-mounted all, or at least most, components of the door mechanism, such as, for instance, window-lift, loudspeaker, lock aggregates, and similar elements, are finding increasing importance in motor vehicle technology. In all cases, the effort is being made to pre-mount the electrical or mechanical window-lift on the module carrier.

When this is done, the following problems arise:

Giving consideration to the structural strength of the partially assembled door, which door comprises an outer panel and an inner panel, in the area of the window line, a broad, often stiffened, metal web of the inner panel must continually remain in place, so that a cutout of the said inner panel clearly lies lower than said window line. Certain types of window-lifts, such as a scissors-jack, bring about no difficulties in the use of pre-mounted module carriers. However, since they cannot guide the window pane with precision, these types of window-lifts require the installation of guide bars for the pane inside the hollow space of the door. This measure is costly and leads to opportunities for breakdown. In the practice, on this account, a window-lift with a double cable is preferred and because of the inherent precision of such lifts as to window guidance, supplementary guide bars become superfluous. The disadvantage of cable operation is found therein, in that the slide bars of the pane carrier must be just as long as corresponds to the entire thrust height of the window pane.

In the case of cable window-lifts, which are pre-mounted on a module carrier, problems arise in the final assembly of motor vehicles with deeply placed window lines, the depth of which lines exceed the inside length of the cutout section in the inner panel of the door.

DE 195 11 105 proposes a solution in which the sliding bars of the cable window-lift are permitted to extend over the edge of the module carrier. During the mounting of the module carrier upon the inner panel, the upper ends of the sliding bars are pushed by tilting the said module carrier into the door hollow space behind the window rim piece of the inner panel, and thereafter turning the module carrier into position in the flat plane of the door, whereupon it is made fast. In order to enable this rotary motion, both the cutout in the inner door panel and the module carrier itself is shaped as a trapezoid. When one considers the entire weight of a pre-mounted module carrier with all components thereon, this stated solution is not assembly-friendly. Additionally, elements for the adjustment of the module carrier are required, especially to fix its exact position in relation to the external window guides.

Consequently, it is the purpose of the invention to make available a motor vehicle door which offers improved possibilities for the mounting of a module carrier with a double cable window-lift, the guide bars of which are longer than the open dimensions of the mounting cutout in the door inner panel and that in the case of low placed window lines of the vehicle, a sufficient thrust of the window panel is thereby guaranteed.

Another purpose of the invention is to make available a door for a motor vehicle in which the precision of the adjustment of the module carrier is improved and the fastening of the same onto the inner panel of the door is simplified, wherein in any case, a secure, peripheral sealing of the module carrier against the inner panel is made possible.

The respective ends of the guide bars of the window-lift lie at the same height with their associated cable pulleys behind the inner panel of the door, when viewed from inside the motor vehicle, and the opposite ends of the said guide bars, with their cable pulleys, are placed in front of the said inner panel. By this arrangement, those ends of the guide bars located behind the inner panel, when pre-mounted on the module carrier, extend beyond the periphery of the carrier. On the other hand, those ends of the guide bars positioned in front of the inner panel lie within the confines of the periphery of the carrier. This arrangement gives rise to several advantages beyond the state of the technology. These advantages are that:

the guide bars can make use of the entire length which is permissible by the hollow space within the door independently of the peripheral bounds of the module carrier, the module carrier can lie against the inner panel about its entire peripheral length and be subject to sealing at the edges thereof, the sealing can be carried out in a "Sealing Line" of simple geometry, and the mounting of the pre-mounted module carrier is simplified, since after the insertion of the extended ends of the guide bars in the hollow space of the door, behind the inner panel of said door, a simple flap motion suffices in order to position the module carrier, further, in doing so, no danger exists that the sealing will be displaced by any rotational movement.

These advantages remain independent as to whether or not the extension of the guide bars occurs above or below the outline of the module carrier as may possibly occur in accord with individual, respective fabrications.

Designing the axles of the cable pulleys as cylindrical shell bearings allows the module carrier to be connected directly with the inner panel of the door through these shells by bolts which penetrate therethrough.

The number of the fastening elements for the module carrier is reduced by this arrangement. It is, however, of special advantage that a portion of the force which acts upon the window-lift is acquired from the inner panel of the door.

The shell bearings of the cable pulleys can further be made use of in a simple and advantageous manner, in positioning and aligning the module carrier during its mounting on the inner panel of the door. For this purpose, the inner panel of the door can be provided with alignment elements, for instance in the form of alignment pins or bushings, which engage in the shell bearing. If the alignment elements can be internally threaded, these can serve as nuts for the fastening bolts which penetrate the shell bearings of the module carrier. Alignment elements of this kind can act as supplementary aids to the mounting, when they engage in the shell bearings of the cable pulleys.

After the adjustment of the guide bars of window-lift (along with the cable pulleys which belong thereto) in the hollow space of the door, then the module carrier with the shell bearings of the cable pulleys can be placed or hung onto the corresponding alignment elements without additional side to side swinging. The said module carrier is thus precisely positioned and relieves the assembly person of handling excess weight.

Assume that the lower ends of the guide bars for the cable operated window-lift extend beyond the lower edge of the module carrier, while at the same time the upper ends remain within the periphery thereof. A possibility then arises for bringing the module carrier into position by simply laying it on the inner panel of the door. This advantage comes about because of a recessing in the upper edge of the inner panel of the door, particularly in that area of the upper ends of the guide bars after the alignment of their lower ends in the lower area of the hollow space of the door. The advantage may be dependent upon an enabling distance of these guide bars (and the corresponding pulley assemblies) from the module carrier.

The cable pulleys allow themselves to be placed closely under the window line because of the corresponding shaping of the recessed area of the inner panel. The upper cable pulleys are then well protected between the module carrier and the aligned inner liner of the door.

In such an arrangement, it is advantageous if the pane support, which comprises a clamping shoe for the pane and also a movable slider on the guide bar, encloses the recessed edge around the inner panel in its U-shaped construction. If this is done, the clamping shoe (and therewith, the lower edge of the pane) approaches, in its raised position, the window line. In this way, the required surface of the pane can be minimized. If the recess of the inner panel in the area of the upper cable pulleys is surrounded by placement surfaces for the peripheral sealing means of the module carrier, then, in the case of a motor vehicle door equipped in accord with the invention, the absolute integrity of the sealing between module carrier and inner panel is assured.

The area above the section of the cutout possesses additional cutout recesses in the inner panel to receive the upper cable pulleys. These recesses allow the pane carrier in its upper position to enter this area, and because of its construction, the shoe clamp can be brought still closer to the window line. As an alternative, the leg of the U-shaped pane carrier can be shortened, which is advantageous for its structural strength.

The recesses of the inner panel in the area of the upper cable pulleys can advantageously by formed with a retrobending of the upper surrounding edge area over its entire length. Then the possibility arises of putting this area to use as an integral component of a box-like stiffening means for the inner sill or approach to the window. A recess of the upper peripheral zone of the inner panel section over approximately the entire length has the additional advantage that the geometry of the peripheral sealing means between the inner panel and the module carrier can be simplified and thus provide greater security in function.

It is likewise possible that the upper ends of the guide bars, with their corresponding pulleys, extend beyond the module carrier, and are located behind the inner panel. When this is the case, then the lower guide bars and attendant pulleys are in front of the inner panel. In this manner, the upper cable pulleys optimally approach the window sill line of the vehicle door, whereby the pane carrier can be designed to be especially compact and rigid.

The guide bars of the window-lift with their cable pulleys, pane carrier and cables are placed in the hollow space of the door, thus also in a damp area of the door. All other pre-mounted components, such as window-lift motor, loudspeaker, door lock action, and the wiring are advantageously installed in concavities facing the inside of the vehicle. These components are thus protected from the action of humidity and are also accessible for monitoring and for maintenance, without the necessity of removing the module carrier from the inner panel. If the module carrier is comprised of a fiber reinforced thermoplastic, then its shaping for recesses presents no difficulty, and further its impact toughness is increased. This latter quality contributes to the inside safety of the passenger cell in the case of a side collision. A further improvement of the interior safety of the passengers arises when the module carrier possesses one or more areas which absorb impact energy. These impact absorbent areas can be directly a part of the molded areas of the module carrier, such as multiple stage pyramid shaped cups or additional collision pillows of a tough, resilient material. If all ends of the guide bars of the window-lift were tightly secured to the inner panel, this would bring about an optimum, reinforced, integral system against side collision. In this situation, working together with the inner panel and the module carrier, the carrier contributes (a) the concave mounting recesses, (b) energy absorbing areas and (c) the guide bars of the window-lift. This is particularly effective when the inner panel itself possesses a reinforcing middle web. Since the module carrier is positionable by a simple flap motion, such a web would be a practical step in design.

The cable of the window-lift makes a cross over between the guide bars. In this area the cable can be led through sheaths, which are retained in place by anchors which are molded onto the back side (that is, in the hollow space of the door) of the module carrier or are mounted thereon. These anchors can be in the form of snap-in elements which possess notches or catches, into which, upon the pre-mounting, the guide sheaths can be inserted.

The invention will, in the following, be described and explained in greater detail with the aid of the drawings.

BRIEF DESCRIPTION OF THE DRAWINGS

There is shown in.

DETAILED DESCRIPTION

Figure 1:
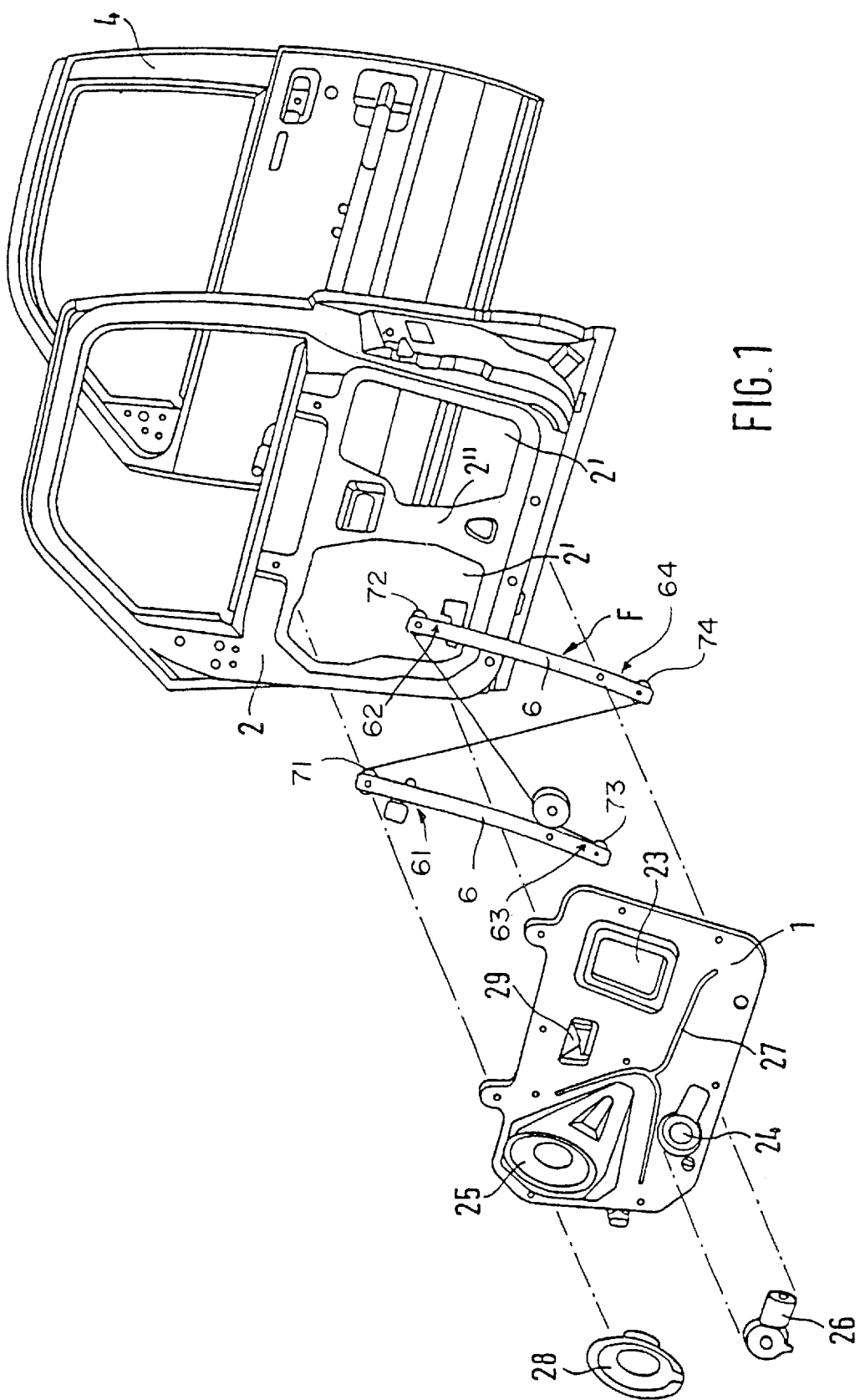
FIG. 1 a simplified exploded perspective view of the components, upon which the invention is based, FIG. 2 a schematic presentation, in perspective, of a motor vehicle door, module carrier, and guide bars of the window-lift for a case in which the lower ends of the guide bars are placed behind the inner panel of door which does not include a web dividing the cutout, FIG. 3 the section 3—3 of FIG. 2 showing a case where the window pane is in its lowered position, i.e. open, FIG. 4 the same section as FIG. 3, but showing the window pane in the upper position, i.e., closed, FIG. 5 an enlarged sectional view of an upper cable pulley showing details of the shell bearing, the alignment bushing, and the fastening of the module carrier onto the inner panel of the door, FIG. 6 a sectional view 6—6 of FIG. 2 of a cable pulley and the lower end of a guide bar of the door lift in the hollow space of the door, this being intended for a case wherein the pulleys extend freely into the said hollow space, FIG. 7 the same view as in FIG. 6 but presenting an example of the possibility of also connecting the lower cable pulleys with the inner panel of the door, possibly with simultaneous alignment, FIG. 8 an enlarged presentation of a portion of FIG. 7 for the clarification of the cable pulley fastening and the possibilities of alignment, FIG. 9 a sectional presentation of the lower end of a guide bar of the window-lift and its cable pulley for a case wherein the lower end of the said guide bar is placed in front of the inner panel, FIG. 10 a presentation the same as FIG. 9, except showing the placement of the upper cable pulley with its fastening on the inner panel, FIG. 11 a view of the design described in FIGS. 9 and 10, but without the fastening of the upper cable pulley and the corresponding upper end of the guide bar, FIG. 12 in perspective, a view of the guide sheaths of the cable and the location of the fastening thereof on the module carrier, FIG. 13 a perspective view of a possible embodiment of a fastening of the cable sheaths, and in FIG. 14 a presentation of the section 14—14 of FIG. 12, of the securement of the cable sheaths between the module carrier with integral affixing angles and the central web of the inner panel of the door.

In FIG. 1, the module carrier is designated by 1, the inner panel of the door by 2, the cutout therein is referred to by 2' and the central web of the inner panel possess 2" as its reference number. The outer door panel is designated with the number 4. The window-lift is designated by F. The module carrier has a concavity 25 to accommodate the loudspeaker and another such recess 29 to receive the door lock activation mechanism. Possibly, when required, there will be a branched cable sheathing 27 in a groove-like depression. Integrally molded to, or mechanically affixed to the module carrier 1 is a shock absorber 23. The loudspeaker and the window-lift motor carry the designations 28 and 26 respectively. The explosion presentation of FIG. 1 clarifies the spatial arrangement of the components.

Figure 2:
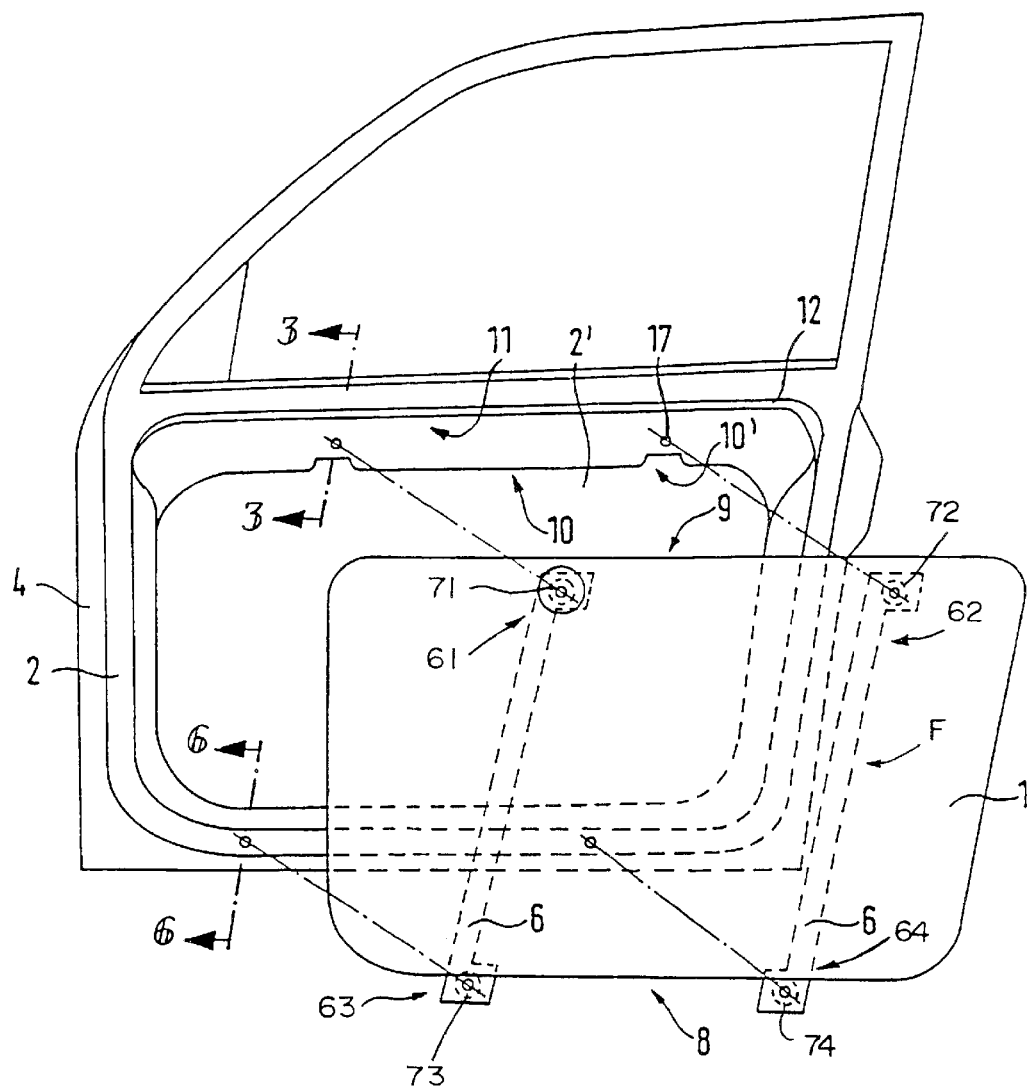

In FIG. 2, the module carrier 1 is shown, which, in its mounted position, covers an unpartitioned cutout 2' of the inner panel 2 of the door. The peripheral edge of the module carrier 1 is provided with an (not shown) unbroken sealing element against the inner panel surface. Where the window-lift F is concerned, the position of the guide bars 6 and the cable pulleys 71, 72, 73, 74 is shown.

Also presented are the ends 6' of the guide bars 63, 64 which extend over the lower peripheral section of the module carrier 1 as well as the ends 6" of the guide bars 61, 62 (upper) which remain within the boundary of the periphery of said module carrier 1. The upper border area 11 above the cutout 2' of the inner panel is, as shown, recessed. In this recessed area, the alignment bushings 17 of the upper cable pulleys 71, 72 find placement. In cutouts 10' of the upper edge line 10 bordering the inner panel cutout 2' are located the shell bearings 15 (not shown) of the upper cable pulleys 71, 72. The reference numbers 8 and 9 respectively refer to lower and upper rims or edges of the module carrier 1.

Figure 3:
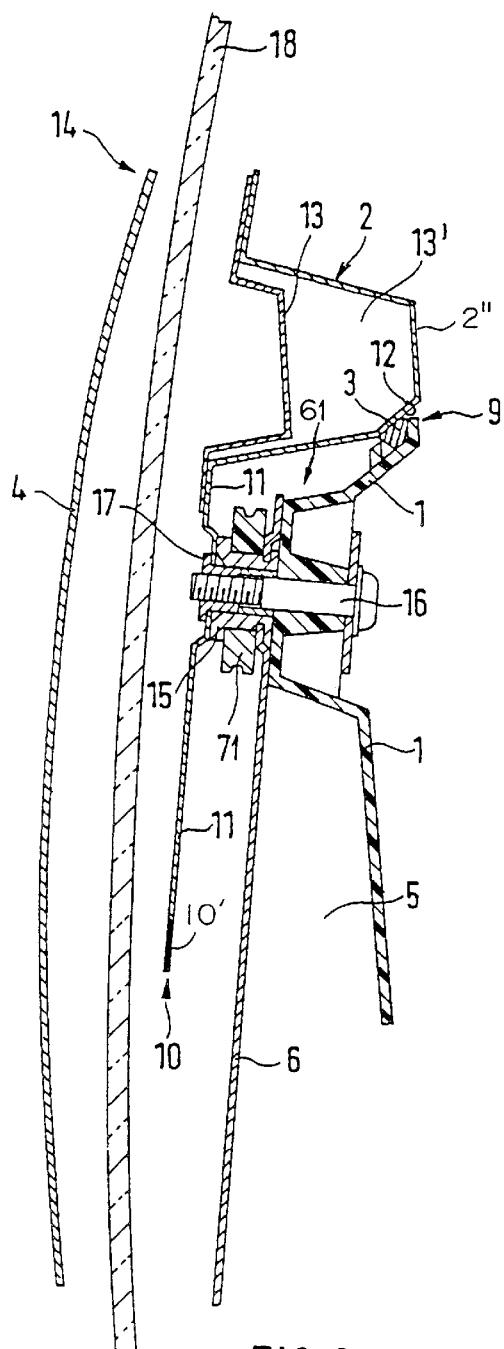
Figure 4:
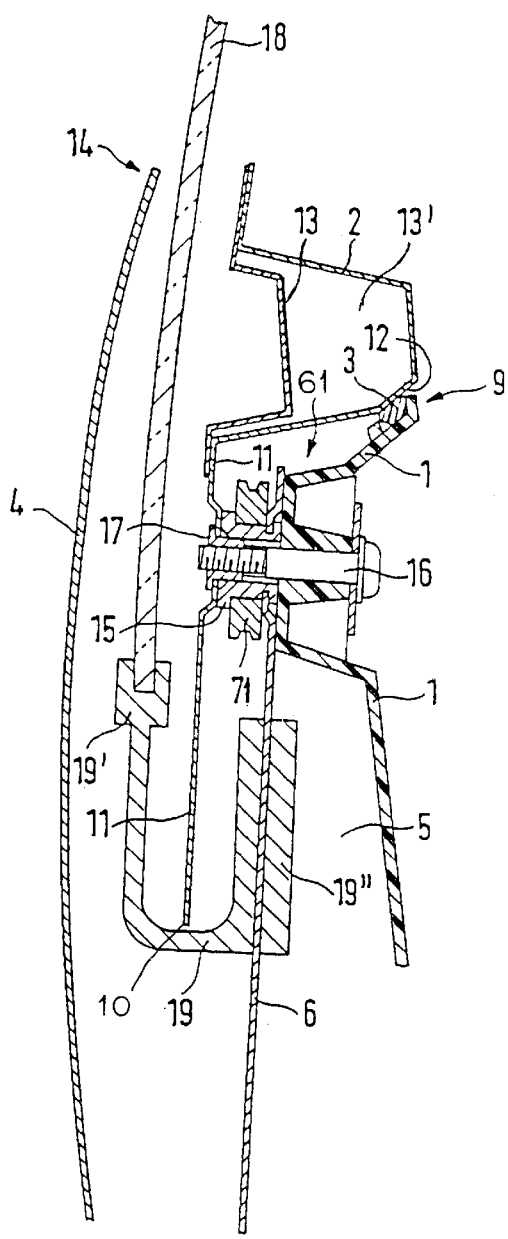
Figure 5:
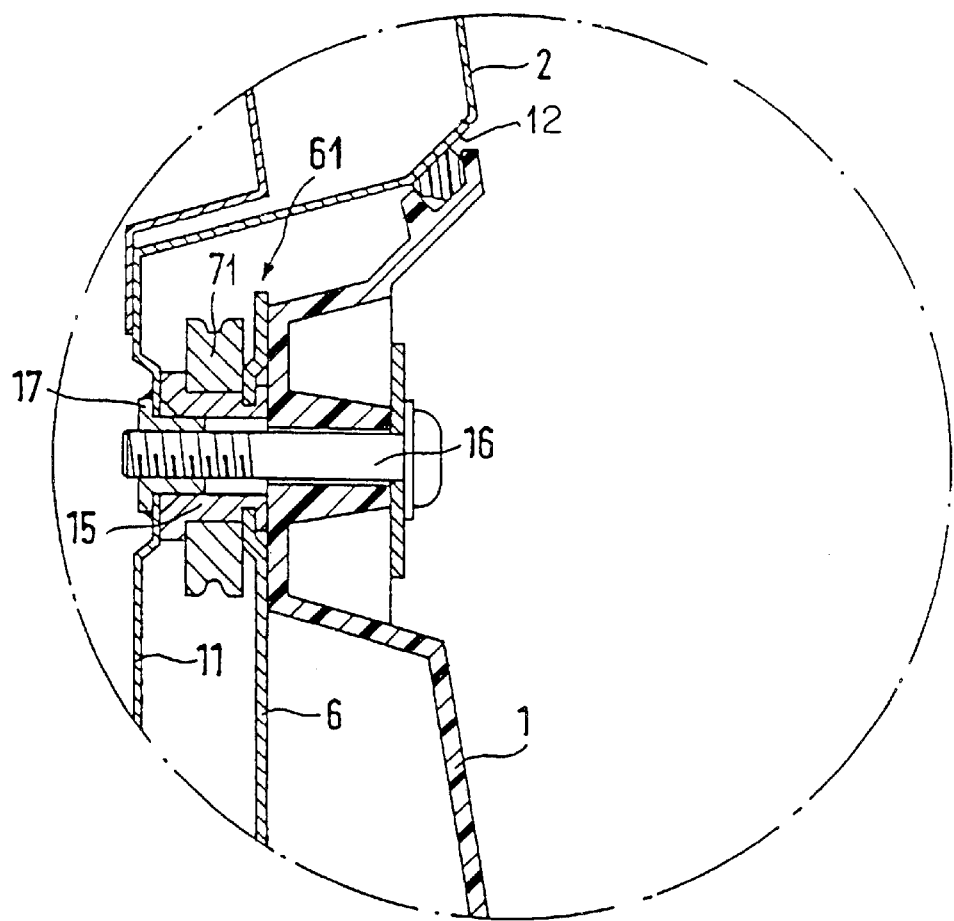
Figure 6:
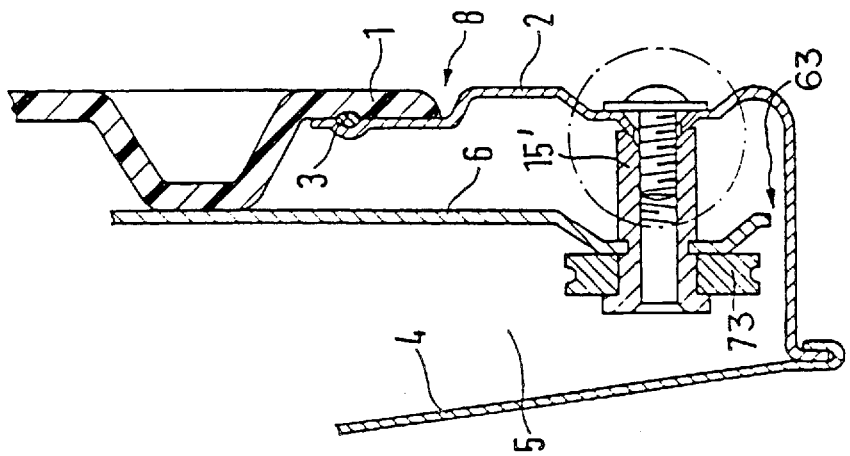
Figure 8:
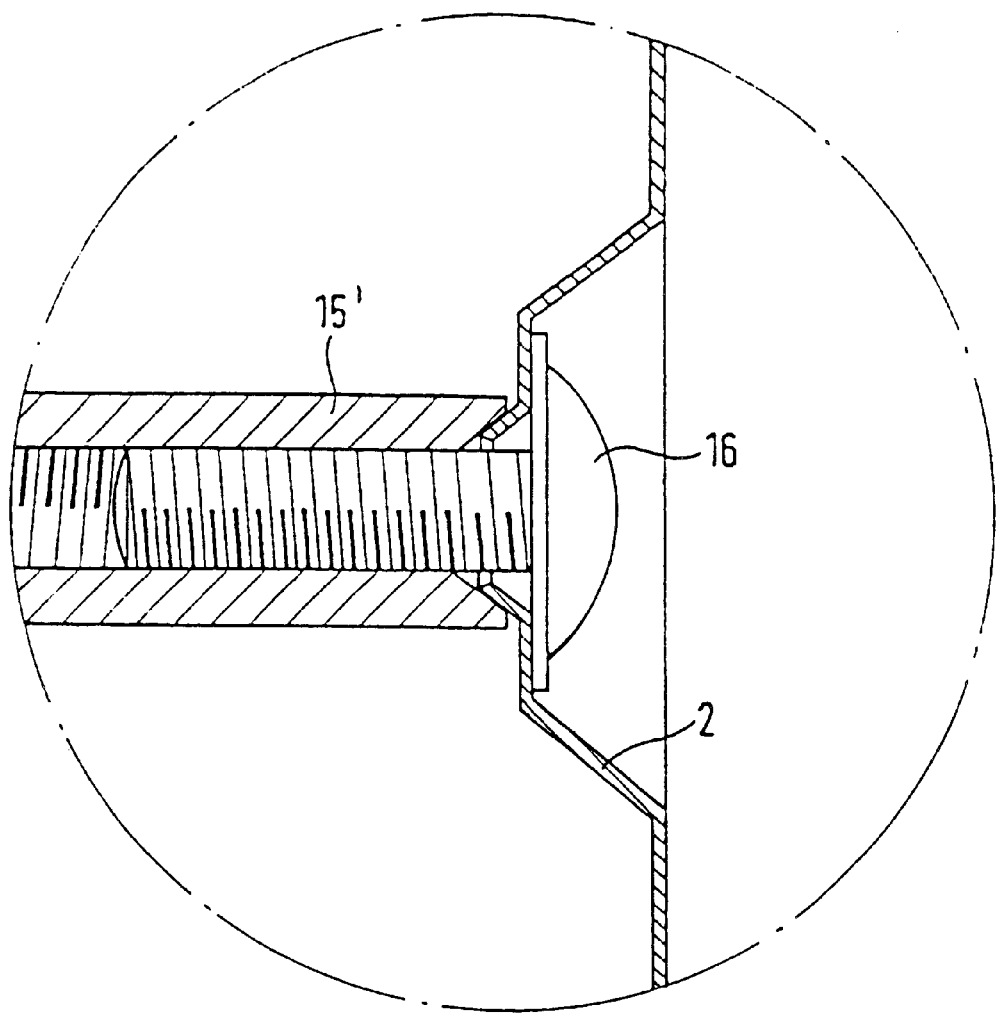

3—3 designates the sectional plane of the FIGS. 3 to 5, while 6—6 represents that plane of FIGS. 6 and 8. The continuous peripheral sealing (not shown) about the module carrier 1 lies in the area of the upper recess 11 on a sealing surface 12. The pane carrier can be accommodated in the cutout 10'.

FIG. 3 provides details of the vehicle door in the assembled condition, along with an example of an upper cable pulley, in accord with the section 3—3 of FIG. 2. The alignment bushing 17 is secured within the recess of upper recessed area 11 of the inner panel 2 by riveting or welding.

The bushing penetrates into shell bearing 15 of cable pulley 71, and thus aligns the module carrier 1 in such a manner that it is directly fastened in the area of the upper recessed area 11 of the inner panel 2. This securement is accomplished with the help of the bolt 16 which is threadedly engaged into the female thread of the alignment bushing 17. The area above the upper recessed area 11 of the inner panel 2 of the door is made into a closed, reinforced box-like structure 13 by the web 2". This provides the vehicle door with additional structural strength. The sealing surface 12 has been integrated into this box-like structure 13, to receive the sealing means 3. In FIG. 3, the pane is run down, that is, the pane carrier is in its lower position.

FIG. 4 shows, in the same presentation as FIG. 3, the pane run up and thus in the closed position. The pane carrier 19, which is comprised of the clamping shoe 19' and the slider 19", finds itself in its upper position. This pane carrier assembly 10 partially encloses the lower edge line 10 of the upper recessed area 11 of the inner panel 2 and opens the possibility of bringing the lower edge of the pane 18 into proximity to the window line 14.

In the presented case, the edge line 10 is not provided with cutouts 10' so that the leg length of the U-shaped pane carrier 19 is relatively long. The legs of the U-shaped pane carrier 19 can be made shorter, by that measure in which the cutouts 10' can be designed. This reduction in length contributes to the overall strength of the window carrier.

FIG. 5 provides an enlarged section from FIG. 3, which demonstrates how the alignment bushing 17 penetrates into the shell bearing 15, wherein the bushing lies with its exposed end against the recessed area of upper recessed area 11 of the inner panel 2, thus enabling a firm securement of the module carrier 1.

Figure 7:
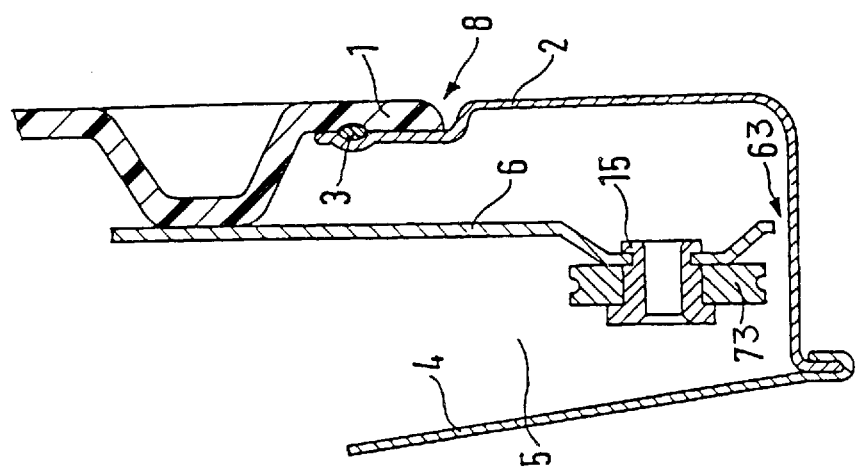

The FIGS. 6 and 7 show the positions of the lower portions of the window-lift assembly, which extend beyond the module carrier 1. FIG. 6 indicates the case in which the guide bar 6 and the lower pulley 73 freely enter into the hollow space 5 of the door. FIG. 7 depicts the case in which the lower cable pulley 73 is connects to, and at the same time aligns the inner panel 2 with the module carrier 1. In this instance, a portion from FIG. 7 has been enlarged into FIG. 8 and shows that the shell bearing 15' is elongated on the rear side and exhibits, in the extension, a female threading. The end of the shell bearing 15' possesses a conically tapered, annular surface, into which a corresponding tapered protrusion of the inner panel 2 aligningly enters. The bolt 16 which engages in the female threads of the extended shell bearing 15' then secures that portion of the part 6' of the guide bar 63 and its pulley 73, which extend beyond the edge of the module carrier 1.

Figure 10:
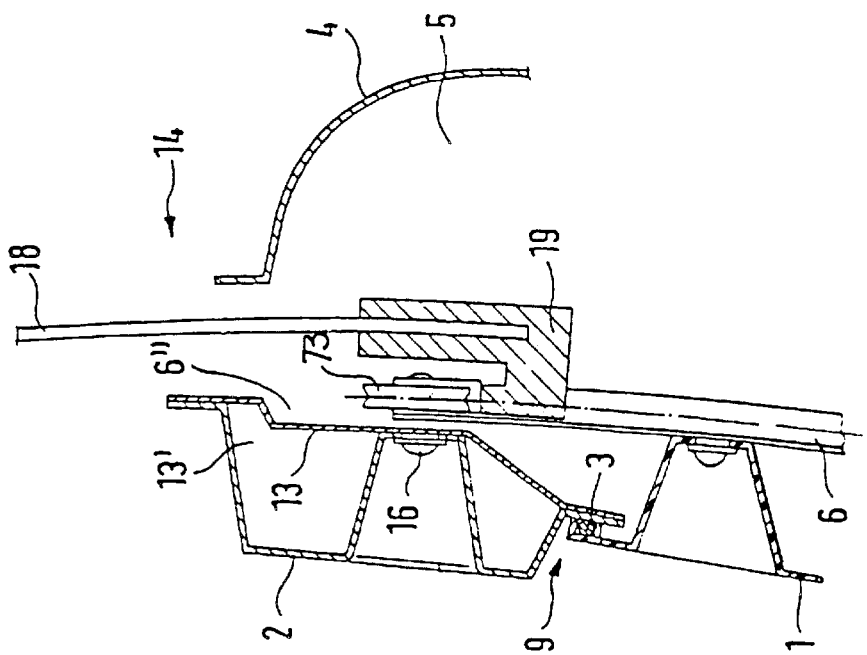
Figure 9:
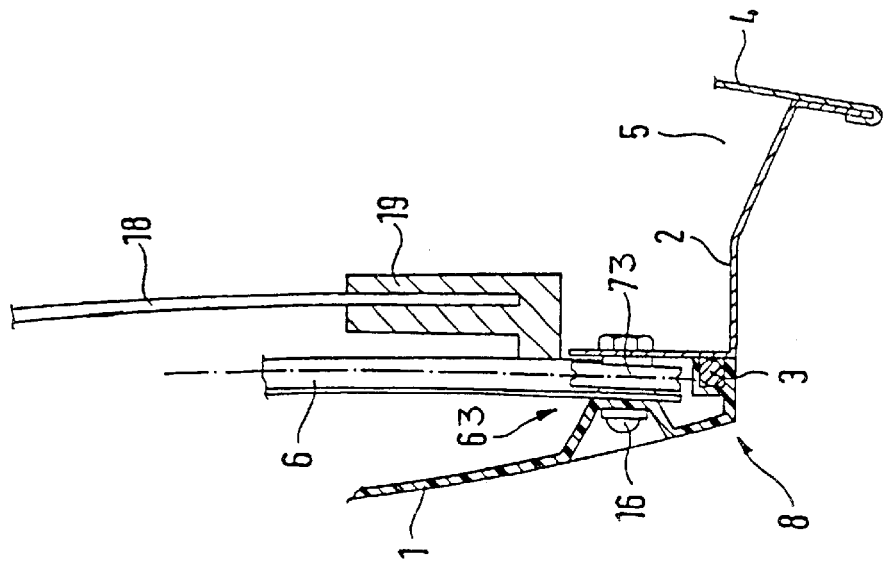
Figure 11:
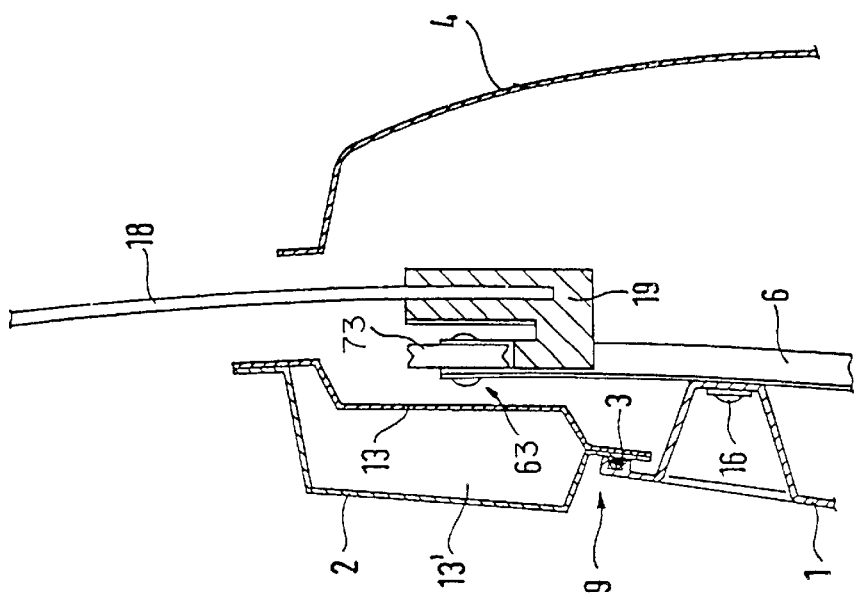

The FIGS. 2 to 8 relate to a case in which the upper ends 6" of the guide bars 61, 62 and their respective pulleys 71, 72 are placed in front of the inner panel 2 of the door and the lower ends 63, 64 are located behind the same. FIGS. 9 to 11 shows the relationships of the case in which the lower guide bar ends 63, 64 (with their cable pulleys 73, 74) lie before, and the upper guide bar ends 61, 62 lie behind the inner panel 2. By means of similar naming of the parts, FIG. 9 shows that the placement of the guide bar ends 63, 64 with their pulleys 73, 74 in front of the inner panel 2, with a conforming shaping of the module carrier 1 is possible to carry this out without any difficulties. Likewise, the fastening of these components onto the inner panel of the door by means of the bolt 16 is also possible. An alignment of the position of the module carrier 1 analogous to FIG. 8 can easily be done.

FIG. 10 clarifies the placement of the upper end 61, 62 of the guide bar 6 (and its pulley 71, 72). FIG. 10 also shows on the depicted example, the direct securement of the guide bar 6 onto the inner panel 2 of the door. In the area of this securement, the inner panel 2 runs through the boxlike reinforcement 13' making up the window edge, forming a concave recess. Also, in this case, an alignment of the module carrier 1 is possible in accord with the example already shown in FIG. 5.

FIG. 11 shows, using the same reference numbers for the components, and the same presentation as FIG. 10, a case wherein a connection of the guide bar 6 with the inner panel 2 of the door can be dispensed with.

The explosion drawing of FIG. 12 shows the use of guide sheaths 22 in the crossover area of the cable 21 of the window-lift. These said sheaths are held by the retainers 20 positioned on the rear side of the module carrier 1. The position of these retainers is indicated in dotted lines in FIG. 12 and a possible manufactured from thereof is shown in FIG. 13. The retainers 20 possess notches for clamping 20', with the aid of which a snap connection can be made with the guide sheaths 22.

Figure 14:
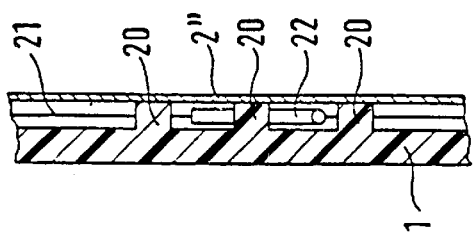

In the FIGS. 1 and 12, the inner panel 2 of the door possesses a central web 2" which subdivides the cutout 2'. With this central webs 2", which primarily serves (as has already been mentioned) for the additional strengthening of the vehicle door, the retention means 20, with the therein affixed cable sheaths 22, can be fully covered. If this be done, in accord with the presentation in FIG. 14, which shows the section 14—14 of FIG. 12, the said retention means 20 can be molded integrally with the module carrier 1. Especially in the case of the employment of fiber reinforced thermoplastics as a material of construction for the module carrier 1, this would be an optimum solution.

What is claimed is:

1. A double walled vehicle door for a vehicle, comprising an inside door panel and an outside door panel forming a space therebetween, the inside door panel having at least one cutout therein, a module carrier attached to the inside door panel such that the module carrier covers and peripherally seals the at least one cutout, a dual cable window lift having guide bars, each guide bar having a lower end with an associated pulley mounted thereon and an upper end with an associated pulley mounted thereon, the dual cable window lift being mounted on the module carrier such that the lower ends of the guide bars extend beyond a periphery of the module carrier and the upper ends of the guide bars are positioned within the periphery of the module carrier, and the upper ends of the guide bas are mounted on a side of the inside door panel adapted to face an interior of the vehicle.

2. The vehicle door according to claim 1, wherein at least one of said pulleys includes a running sleeve for receiving a screw which connects the module carrier directly to the inside door panel.

3. The vehicle door according to claim 2, wherein the inside door panel has at least one centering sleeve for engaging the running sleeve.

4. The vehicle door according to claim 3, wherein the centering sleeve has an inner thread into which the screw can be screwed.

5. The vehicle door according to claim 3, wherein an upper edge of the cutout in the inside door panel has, at least in regions of the upper ends of the guide bars of the window lift, indentations which open downwards and which receive a respective one of the pulleys.

6. The vehicle door according to claim 5, wherein a window pane support formed by a clamping shoe and a slider is arranged in such a way that the clamping shoe is adapted to be arranged between one of the indentations of the inside door panel and the outside door panel and the slider is adapted to be arranged between the module carrier and the one of the indentations of the inside door panel.

7. The vehicle door according to claim 2, wherein an upper edge of the cutout in the inside door panel has, at least in regions of the upper ends of the guide bars of the window lift, indentations which open downwards and which receive a respective one of the pulleys.

8. The vehicle door according to claim 7, wherein a window pane support formed by a clamping shoe and a slider is arranged in such a way that the clamping shoe is adapted to be arranged between one of the indentations of the inside door panel and the outside door panel and the slider is adapted to be arranged between the module carrier and the one of the indentations of the inside door panel.

9. The vehicle door according to claim 2 wherein an upper edge of the cutout in the inside door panel is continuously indented along most of its length.

10. The vehicle door according to claim 1, wherein the window lift includes sleeves for guiding cables of the window lift in an area where the cables intersect, said sleeves are mounted to the module carrier by affixing angles on a side of the module carrier facing toward the outside door panel, wherein the affixing angles include ribs for retaining the sleeves therein.

11. The vehicle door according to claim 1, wherein an upper edge of the cutout in the inside door panel has, at least in regions of the upper ends of the guide bars of the window lift, indentations which open downwards and which receive a respective one of the pulleys.

12. The vehicle door according to claim 11, wherein a window pane support formed by a clamping shoe and a slider is arranged in such a way that the clamping shoe is adapted to be disposed between one of the indentations of the inside door panel and the outside door panel and the slider is adapted to be disposed between the module carrier and the one of the indentations of the inside door panel.

13. The vehicle door according to claim 12 wherein the upper edge of the cutout of the inside door panel has cutouts for accommodating movement of the window pane support.

14. The vehicle door according to claim 1, wherein an upper edge of the cutout of the inside door panel has cutouts for accommodating movement of a window pane support.

15. The vehicle door according to claim 1, wherein an upper edge of the cutout in the inside door panel is continuously indented along most of its length.

16. The vehicle door according to claim 1, wherein an upper edge line bordering the cutout in the inside door panel is a component part of a reinforcement disposed adjacent a window line of the door.

17. The vehicle door according to claim 1, wherein components mounted on the module carrier are arranged in recesses on a side of the module carrier adapted to face towards the vehicle interior.

18. The vehicle door according to claim 1, wherein the module carrier consists of fiber-reinforced plastic material.

19. The vehicle door according to claim 1, wherein the module carrier has areas which are formed to absorb an impact force.

20. The vehicle door according to claim 1, wherein the guide bars of the window lift are connected to the inside door panel and form a portion of a side impact system.

* * * * *